United States Patent
Stopel et al.

(10) Patent No.: US 9,946,726 B2
(45) Date of Patent: Apr. 17, 2018

(54) METHOD AND SYSTEM FOR EXECUTION OF DISCONNECTION FROM AND RECONNECTION TO PERSISTENT HANDLES

(71) Applicant: Dell Products L.P., Round Rock, TX (US)

(72) Inventors: Anna Stopel, Herzliya (IL); Dina Fine, Herzlia (IL)

(73) Assignee: Dell Products L.P., Round Rock, TX (US)

(*) Notice: Subject to any disclaimer, the term of this patent is extended or adjusted under 35 U.S.C. 154(b) by 310 days.

(21) Appl. No.: 14/960,548

(22) Filed: Dec. 7, 2015

(65) Prior Publication Data
US 2017/0161299 A1 Jun. 8, 2017

(51) Int. Cl.
G06F 15/16 (2006.01)
G06F 17/30 (2006.01)
H04L 29/08 (2006.01)
H04L 29/06 (2006.01)

(52) U.S. Cl.
CPC .... G06F 17/30194 (2013.01); H04L 67/1097 (2013.01); H04L 67/42 (2013.01)

(58) Field of Classification Search
CPC ........... G06F 17/30194; H04L 67/1097; H04L 67/42
See application file for complete search history.

(56) References Cited

U.S. PATENT DOCUMENTS

| | | | |
|---|---|---|---|
| 2004/0006565 A1* | 1/2004 | Shmueli | G06F 17/30067 |
| 2012/0151249 A1* | 6/2012 | Swan | G06F 11/1443 714/4.11 |
| 2013/0007518 A1* | 1/2013 | George | H04L 67/06 714/16 |

* cited by examiner

*Primary Examiner* — Padma Mundur
(74) *Attorney, Agent, or Firm* — Pearl Cohen Zedek Latzer Baratz LLP

(57) ABSTRACT

A method and a system for execution of disconnection from and reconnection to persistent handles are provided herein. The method may include the following steps: generating a file handle, responsive to a file connect request sent by a client to a distributed file system, wherein the handle has a handle identifier; associating a reconnect identifier with the handle identifier, wherein the reconnect identifier is indicative of a most recent connect attempt made using the respective handle identifier at a respective request; sending a disconnect request responsive to a disconnection, wherein the disconnect request is sent with a reconnect identifier indicative of a connection prior to the disconnection; updating the reconnect identifier, responsive to a reconnect request associated with said handle identifier; and approving the disconnect request only in a case that the reconnect identifier of the disconnect request is identical to the reconnect identifier of the reconnect request.

11 Claims, 4 Drawing Sheets

METHOD AND SYSTEM FOR EXECUTION OF DISCONNECTION FROM AND RECONNECTION TO PERSISTENT HANDLES

FIELD OF THE INVENTION

The present invention relates generally to the field of storage, and more particularly to distributed shared files systems.

BACKGROUND OF THE INVENTION

FIG. 1 is a block diagram illustrating non-limiting exemplary architecture of a distributed file system 100 implementing a Network Attached Storage (NAS) in accordance with the prior art. Distributed file server 120 may include a plurality of nodes (aka controllers) 130-1 to 130-x connected to a bus 180 operating in Internet Small Computer Systems Interface (iSCSI), a fiber channel (FC) or the like.

Bus 180 connects distributed file server 120 to a plurality of block storage devices 190 possibly configured as a part of a Storage Area Network (SAN) device aligned, for example, in a Redundant Array of Independent Disks (RAID) configuration.

Each of nodes 130-1 to 130-x may include a central processing unit (CPU) 160-1 to 160-x respectively, and memory units 150-1 to 150-x respectively, on which several processes are being executed. Nodes 130-1 to 130-x may communicate with a plurality of clients over network protocols such as Network File System (NFS) and Server Message Block (SMB).

Some of the processes running over nodes 130-1 to 130-x may include file system daemons (FSDs) 170-1 to 170-x. Each of nodes 130-1 to 130-x may include one or more FSDs which serve as containers for services and effectively control files in distributed file server 120.

Files in distributed file server 120 are distributed across FSDs 170-1 to 170-x and across nodes 130-1 to 130-x. Distributed file server 120 may also include file servers 140-1 to 140-x in at least one of nodes 130-1 to 130-x, wherein each of file servers 140-1 to 140-x may receive file system connect requests 112 from clients such as client machine 110.

Such client machine 110 may include, in a non-limiting example, Windows™ clients communicating over Server Message Block (SMB) protocol. Upon receiving such a connect request 112, file servers 140-1 to 140-x refer the requests to one of FSDs 170-1 to 170-x that holds the required file.

In accordance with the SMB protocol, each of FSDs 170-1 to 170-x may include an SMB server (not shown here) which is a process running on the node and configured to control the network communication in accordance with the SMB protocol. When a file is first requested by a client, for each client requesting a file, the SMB server allocates a unique persistent file handle associated with a specific client. The handle is an object which determines file name and other identifiers and the state which indicates the permissions of a specific client and other clients, and what other operations are the other clients are prevented from (aka share mode).

In SMB protocol, the handle serves as a mechanism allowing a specific client to establish or reestablish connection to a certain file after disconnection. In a case that SMB3 protocol is implemented, system failovers and/or node/FSD exchanges may be transparent to a client. That is, if connection with an FSD is lost, for example if a node or FSD fails or if the file server redirects a file to another node or FSD for better load balancing, the client may be reconnected to another node/FSD without interruption with the client's operations. In such cases, the persistent handle state must be preserved from the moment of connection loss and until client is reconnected again, for example to the other node/FSD.

The persistent handle state is notified about disconnection or reconnection of the client. However, in distributed environment such as distributed file server 120, the notifications might arrive in non-chronological order, which may cause a failure in case a former disconnection notice arrives to the handle state after the handle was already reconnected and a corresponding reconnection notice was received.

SUMMARY OF THE INVENTION

Some embodiments of the present invention provide a mechanism for handling disconnection and reconnection notifications in a distributed system. Specifically, embodiments of the present invention overcomes the problem of an out of date "disconnect" request arriving after a fresh "reconnect" request has arrived. The method may include the following steps: generating a file handle having a reconnect identifier indicative of reconnection, responsive to a file request made by a client to a distributed server; maintaining, on a handle state module located on a node at the distributed server a handle state which includes a handle identification and a reconnect identifier; sending a disconnect command from the node, responsive to a disconnection, to the handle state module, wherein the disconnect command is sent with a reconnect identifier indicative of a reconnection prior to the disconnection; attempting reconnecting the client to the handle via another node and changing the reconnect identifier to indicate a further reconnecting; verifying at the handle state module that the reconnect identifier equals to the one stored in state of the handle; in case a reconnection command was received after the disconnection command was issued and before the disconnection command arrived, the reconnect identifier was updated and the reconnect identifier of the disconnect command is outdated and, the disconnection will not be carried out; and in a case no reconnection commands was received after the disconnection command was issued and before the disconnection command arrived, the reconnect identifier of the disconnect command is equal to the stored reconnect identifier, and the disconnection is executed.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
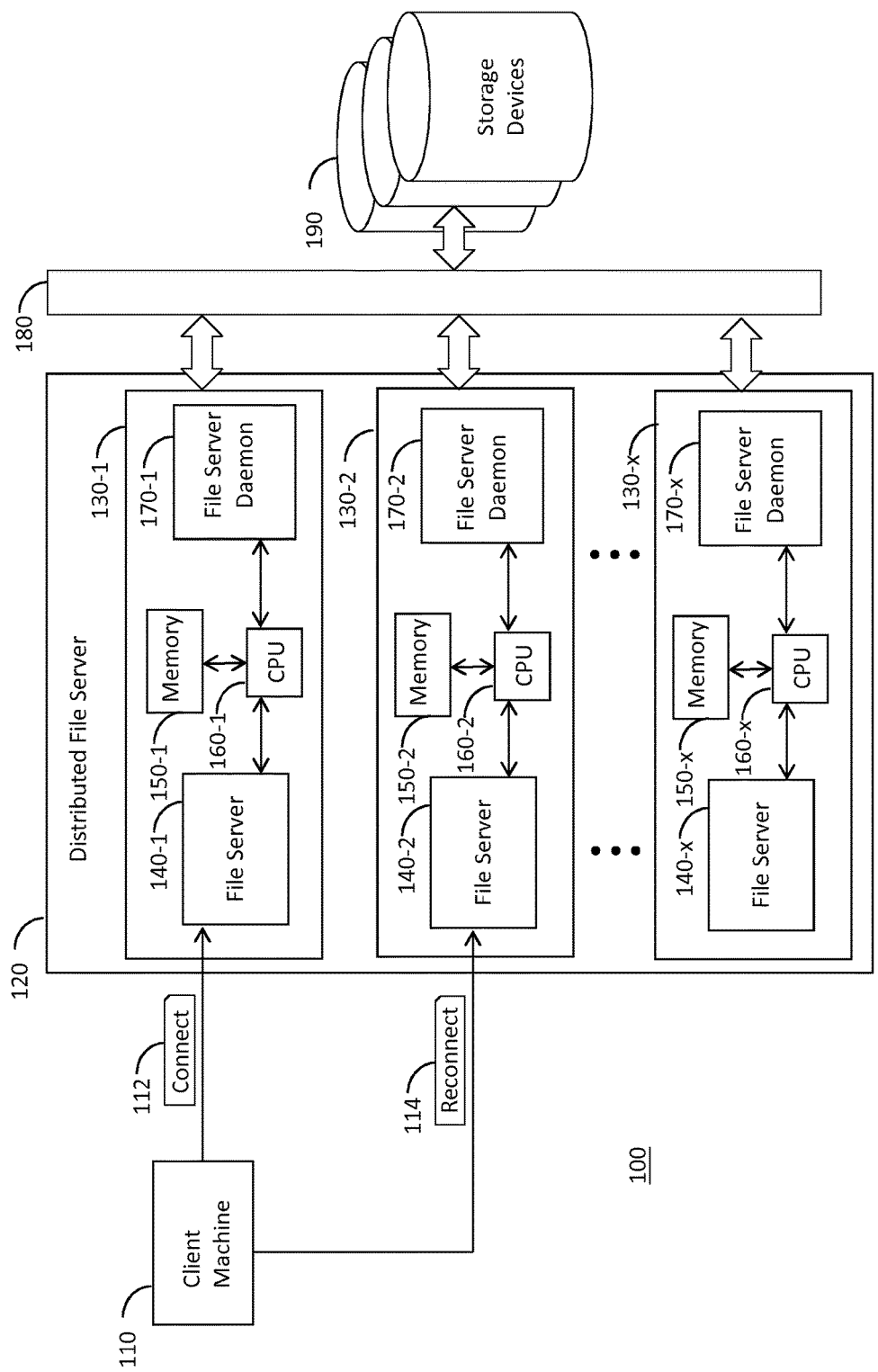
FIG. 1 is a block diagram illustrating non-limiting exemplary architecture of a file system in accordance with embodiments of the prior art.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention provide a file system that may include a plurality of nodes, each having a computer processor, a memory, and a plurality of processes running over the processors and connected via a network protocol to at least one storage devices.

Over the aforementioned computer processors, a plurality of processes may be executed. Among them: a first process of the plurality of processes configured to generate a file handle, responsive to a file connect request sent by a client to the file system, wherein the handle has a handle identifier; a second process of the plurality of processes configured to associate a reconnect identifier with the handle identifier, wherein the reconnect identifier is indicative of a most recent connect attempt made using the respective handle identifier at a respective request; a third process of the plurality of processes configured to send a disconnect request responsive to a disconnection, wherein the disconnect request is sent with a reconnect identifier indicative of a connection prior to the disconnection; a fourth process of the plurality of processes configured to update the reconnect identifier, responsive to a reconnect request associated with the handle identifier; and a fifth process of the plurality of processes configure to approve the disconnect request only in a case that the reconnect identifier of the disconnect request is identical to the reconnect identifier of the reconnect request.

In accordance with embodiments of the present invention, in a case that the reconnect identifier of the disconnect request is non-identical to the reconnect identifier of the reconnect request, the fifth process may be configured to ignore the disconnect request.

In accordance with embodiments of the present invention, the handle identifier may be unique throughout the distributed file system.

In accordance with embodiments of the present invention, using the reconnect identifier on the distributed files system complies with version 3 of Server Message Block (SMB3) network protocol.

In accordance with embodiments of the present invention, reconnect identifier may include a counter and wherein the updating of the reconnect identifier at the fourth process may include incrementing the counter.

In accordance with embodiments of the present invention, the reconnect identifier of the disconnect request may be determined identical to the reconnect identifier of the reconnect request if the counter of the disconnect request and the counter of the reconnect request are equal.

In accordance with embodiments of the present invention, the first and the second processes may be carried out by an SMB server in compliance with the SMB3 network protocol.

In accordance with embodiments of the present invention, the fourth and the fifth processes may be carried out by a handle state module server in compliance with the SMB3 network protocol.

In accordance with embodiments of the present invention, the associating of the reconnect identifier with the handle identifier may yield a reduced handle state compared with the handle state carried out at the handle state module.

Figure 2:
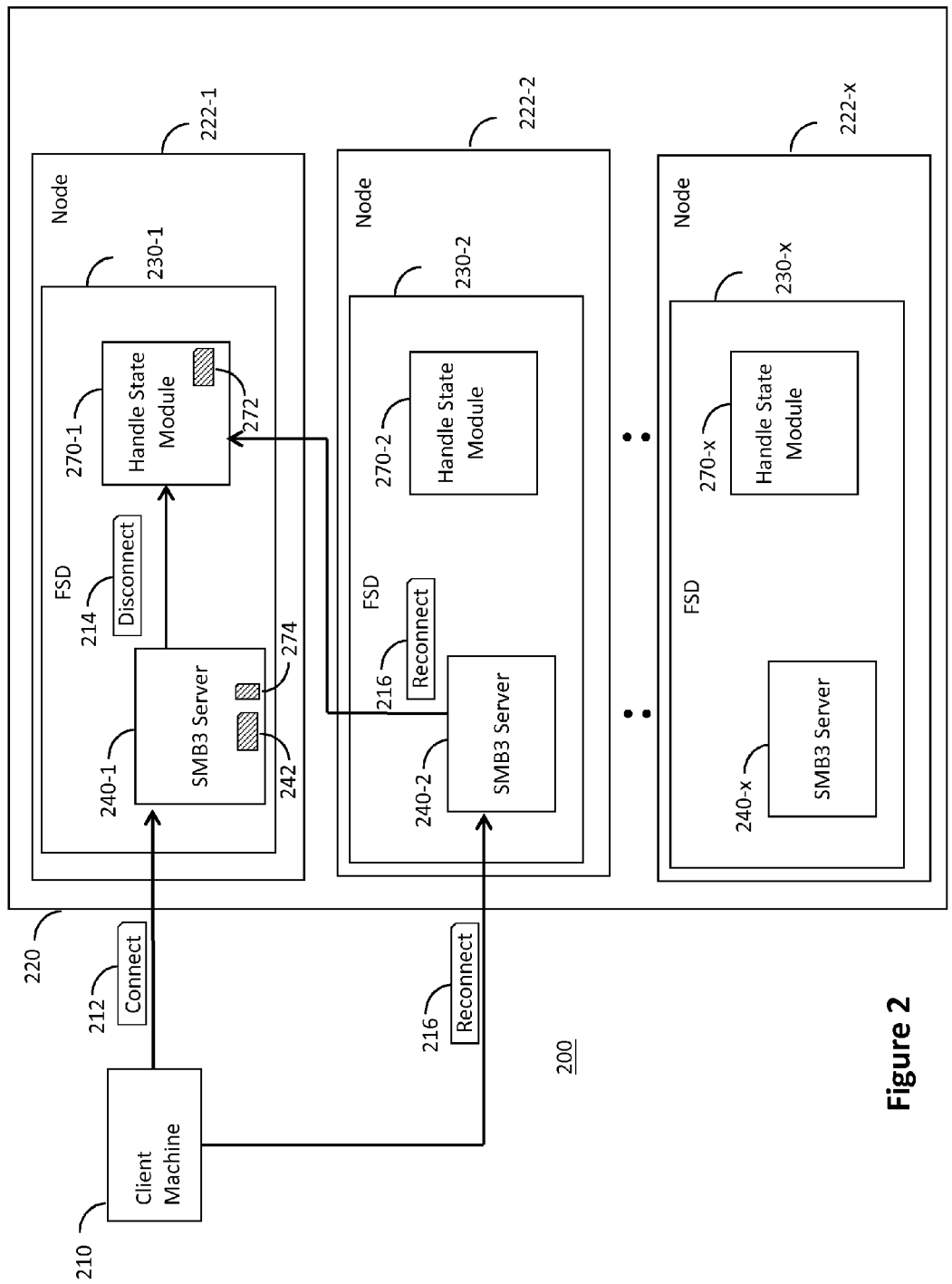
FIG. 2 is a block diagram illustrating non-limiting exemplary architecture of a file system in accordance with embodiments of the present invention.

FIG. 2 is a block diagram illustrating a non-limiting exemplary architecture of a file system in accordance with embodiments of the present invention. Distributed server system 200 may include a client machine 210 and a distributed server 220 both may be executed a software modules over one or more computer processors (not shown here).

Distributed server 220 may include a plurality of file nodes 222-1, 222-2 . . . 222-x, each having one or more FSDs 230-1, 230-2 . . . 230-x. Each FSD may include an SMB server 240-1, 240-2. Computer processors and memory are not shown here for simplicity but are included in each of node 222-1 to 222-x in a similar manner as illustrated in distributed file server 120 shown and described in FIG. 1).

In accordance with the SMB3 protocol, when a file is first requested by client 210 as in connect request 212 a handle may be created and assigned to one of FSDs 230-1. SMB server 240-1 allocates a unique persistent file handle 242 associated with client 210. Handle state module 270-1 generates a corresponding handle state 272 for persistent file handle 242. Handle state 272 indicates all permissions associated with the specific file associated with the client who asked for the file and further relating to other clients on the system.

In accordance with embodiments of the present invention and in compliance with the SMB3 protocol, SMB3 server 240-1 generates a so called "light weight" or reduced handle state 272 which includes the unique handle ID and a reconnect identifier which indicates chronological data relating to the handle. Specifically, a reconnect identifier needs to enable the system to distinguish between two handles issued or used at different times.

In accordance with embodiments of the preset invention, a connect request 212 causes the generation of a handle reconnect identification of a specific value by handle state module 270-1. In a case of a disconnection, client 210 sends a reconnect request 216, to another node 222-2 in which SMB3 server 240-2 forwards the request to the handle state module 270-1 of FSD 230-1. Handle state module 270-1 changes the handle reconnect identification to a more updated one.

In accordance with embodiments of the preset invention, in a case that the disconnect request 214 arrives at handle state module 270-1 after reconnect request 216 has arrived, the handle reconnect identification associated with reconnect request 216 is different from the handle reconnect identification of disconnect request 214 and therefore disconnect request 214 is ignored.

If, however, the handle reconnect identification associated with reconnect request 216 is equal to the handle reconnect identification of disconnect request 214, the disconnect request 214 is executed.

Advantageously, the aforementioned mechanism of using a handle reconnect identifier addresses the potential problem of conflicting requests due to non-chronological nature of distributed systems, while adhering to the SMB3 protocol.

Figure 3:
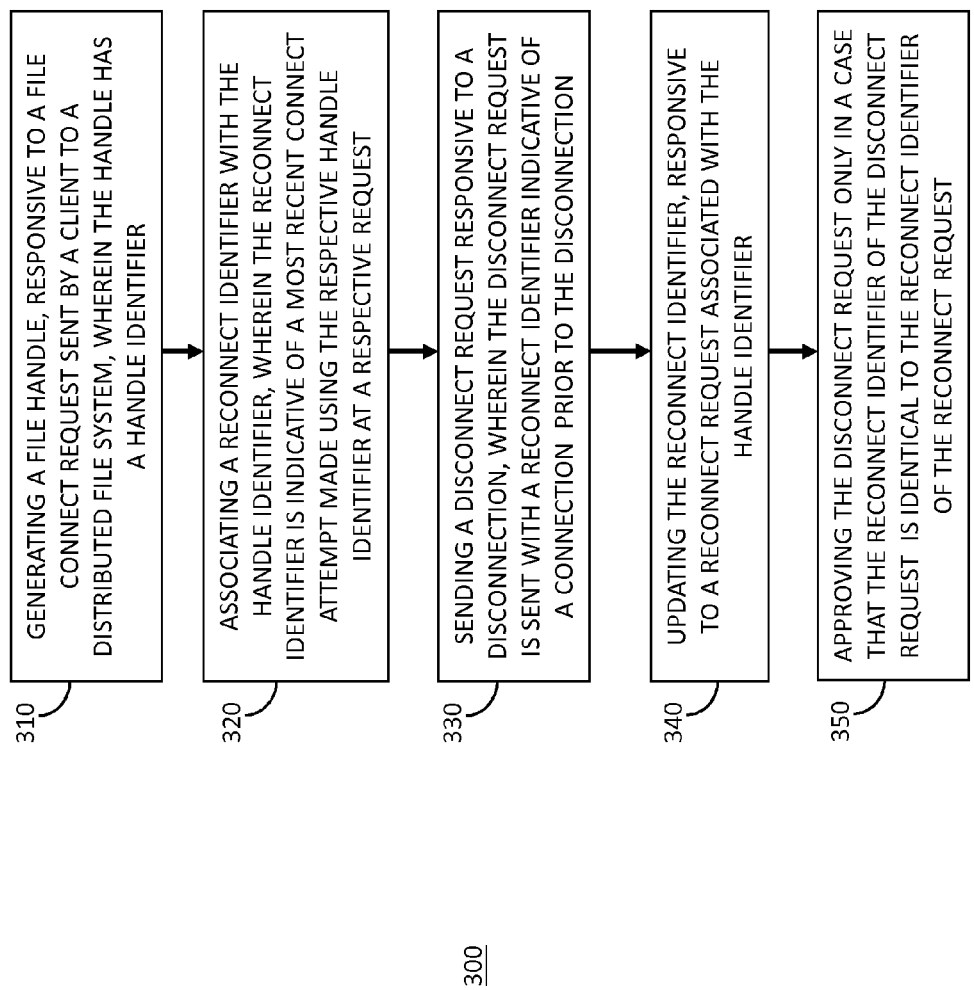
FIG. 3 is a high level flowchart illustrating non-limiting exemplary method in accordance with embodiments of the present invention.

FIG. 3 is a high level flowchart illustrating non-limiting exemplary method addressing the aforementioned problem in accordance with embodiments of the present invention. Method 300 may include the following steps: generating a file handle, responsive to a file connect request sent by a client to a distributed file system, wherein the handle has a handle identifier 310; associating a reconnect identifier with the handle identifier, wherein the reconnect identifier is indicative of a most recent connect attempt made using the respective handle identifier at a respective request 320; sending a disconnect request responsive to a disconnection, wherein the disconnect request is sent with a reconnect identifier indicative of a connection prior to the disconnection 330; updating the reconnect identifier, responsive to a reconnect request associated with the handle identifier 340; and approving the disconnect request only in a case that the reconnect identifier of the disconnect request is identical to the reconnect identifier of the reconnect request 350.

In accordance with embodiments of the present invention, in a case that the reconnect identifier of the disconnect request is non-identical to the reconnect identifier of the reconnect request, disconnect request is being ignored.

In accordance with embodiments of the present invention, the handle identifier may be unique throughout the distributed file system.

In accordance with embodiments of the present invention, using the reconnect identifier on the distributed files system complies with version 3 of Server Message Block (SMB3) network protocol. Advantageously, implementing embodiments of the present invention in an SMB3 compliant file system does not require any modification of the network protocol and can be refitted to work in compliance with the SMB3 network protocol.

In accordance with embodiments of the present invention, the reconnect identifier may include a counter and wherein the updating of the reconnect identifier may be carried out by incrementing the counter.

In accordance with embodiments of the present invention, the reconnect identifier of the disconnect request may be determined identical to the reconnect identifier of the reconnect request if the counter of the disconnect request and the counter of the reconnect request are equal.

Figure 4:
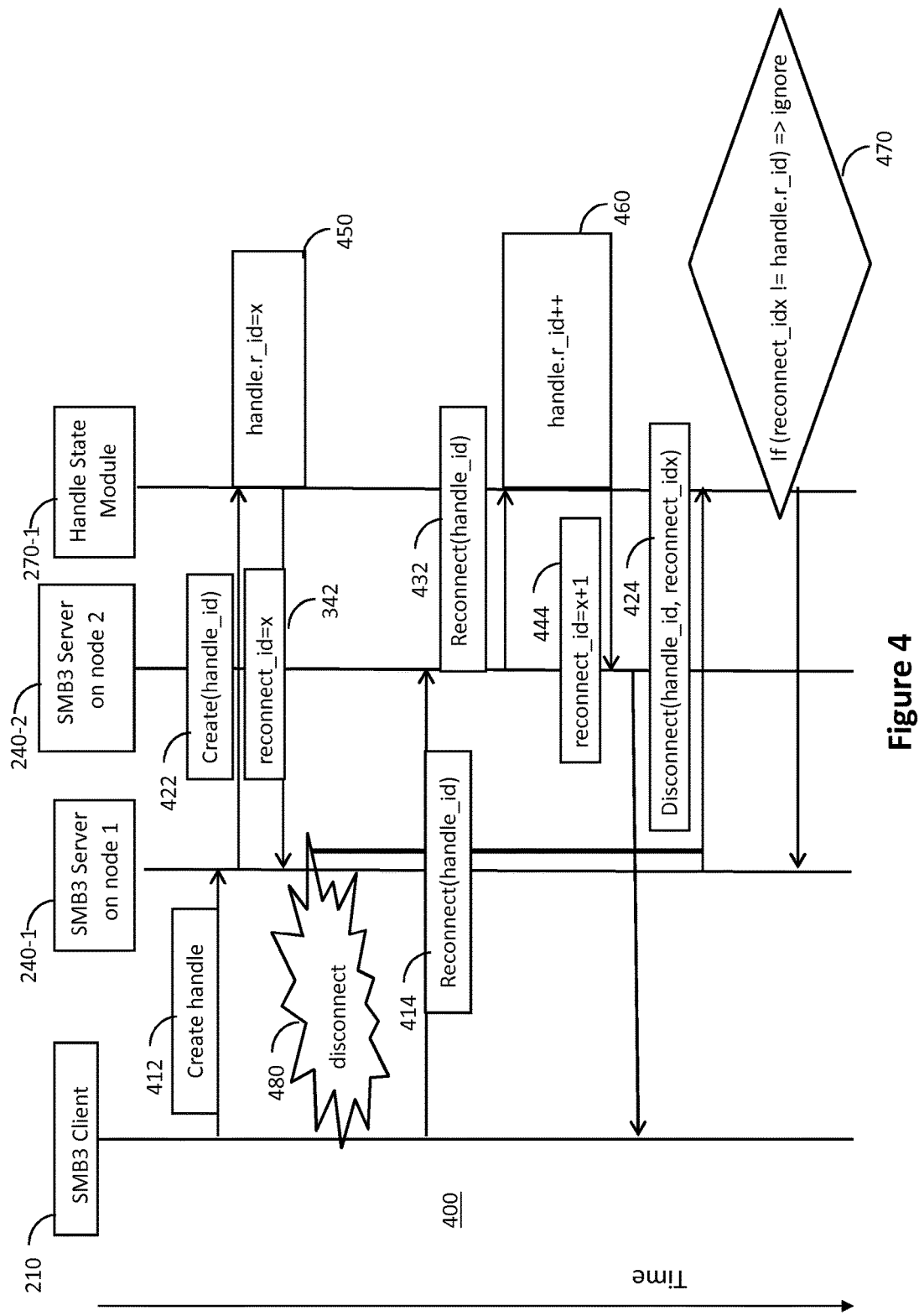
FIG. 4 is a state-diagram illustrating a method for handling disconnections and reconnections according to embodiments of the present invention.

FIG. 4 is a more detailed state-diagram 400 illustrating a non-limiting exemplary implementation of aforementioned method 300 for handling disconnections and reconnections in compliance with SMB3 protocol.

In accordance with embodiments of the present invention, SMB3 client 210 issues a connect request which includes a "create handle" operation 412 file applied to SMB3 server on node 1 240-1. SMB3 server on node 1 240-1 then forwards a "create (handle.id)" operation to handle state module 270-1 which in return assigns a value (e.g. 'x') to handle reconnect identifier 342 and forwards this value back to SMB3 server on node 1 240-1.

After a disconnection 480, SMB3 client 210 issues, to SMB3 server on node 2 240-2, a reconnect request 414 which includes the handle identification assigned to it.

SMB3 server on node 2 240-2 forwards the disconnect request 432 to handle state module 270-1 which updates the value of the handle reconnect identifier. The update can be implemented, in a non-limiting way as a counter that is incremented each time an attempt reconnection arrives to handle state module 270-1. The updated handle reconnect identifier 444 is then forwarded back to the client 210. When the disconnect request 424 arrives at handle state module 270-1, it has a handle reconnect identifier with it. If the value of the handle reconnect identifier equal to the value of the handle reconnect identifier on the reconnect request 432 then the disconnect request 424 is a valid one and should be executed. If however, the values are different, it means that the disconnect request in an old one due to latency in distributed file server 120 (depicted as the thick vertical line between disconnect 480 and disconnect request 424).

It should be noted that the method according to embodiments of the present invention may be stored as instructions in a computer readable medium to cause processors, such as central processing units (CPU) 160-1 to 160-$x$, on nodes 130-1 to 130-$x$ to perform the method. Additionally, the method described in the present disclosure can be stored as instructions in a non-transitory computer readable medium, such as storage devices 190 which may include hard disk drives, solid state drives, flash memories, and the like. Additionally non-transitory computer readable medium can be memory units 150-1 to 150-$x$ which reside on nodes 130-1 to 130-$x$ of distributed file server 120.

In accordance with embodiments of the present invention, a non-transitory computer readable medium may include a set of instructions that when executed cause at least one processor to: generate a file handle, responsive to a file connect request sent by a client to the file system, wherein the handle has a handle identifier; associate a reconnect identifier with the handle identifier, wherein the reconnect identifier is indicative of a most recent connect attempt made using the respective handle identifier at a respective request; send a disconnect request responsive to a disconnection, wherein the disconnect request is sent with a reconnect identifier indicative of a connection prior to the disconnection; update the reconnect identifier, responsive to a reconnect request associated with the handle identifier; and approve the disconnect request only in a case that the reconnect identifier of the disconnect request is identical to the reconnect identifier of the reconnect request.

In accordance with embodiments of the present invention, the non-transitory computer readable medium may further include a set of instructions, when executed, further cause the least one processor to ignore the disconnect request in a case that the reconnect identifier of the disconnect request is non-identical to the reconnect identifier of the reconnect request.

In accordance with embodiments of the present invention, the non-transitory computer readable medium includes a set of instructions that are compliant with the SMB3 network protocol.

In order to implement the method according to embodiments of the present invention, a computer processor may receive instructions and data from a read-only memory or a random access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method comprising:
    generating a file handle, responsive to a file connect request sent by a client to a distributed file system, wherein the handle has a handle identifier that is unique throughout the distributed file system;
    associating a reconnect identifier with the handle identifier, wherein the reconnect identifier is indicative of a most recent connect attempt made using the respective handle identifier at a respective reconnect request;
    sending a disconnect request responsive to a disconnection, wherein the disconnect request is sent with a reconnect identifier indicative of a connection prior to the disconnection;
    updating the reconnect identifier, responsive to a reconnect request associated with said handle identifier;
    approving the disconnect request only in a case that the reconnect identifier of the disconnect request is identical to the reconnect identifier of the most recent reconnect request indicative of a match between the reconnect request and its subsequent disconnect request;
    ignoring the disconnect request in a case that the reconnect identifier of the disconnect request is non-identical to the reconnect identifier of the most recent reconnect request; and
    wherein using said reconnect identifier on said distributed file system complies with version 3 of Server Message Block (SMB3) network protocol.

2. The method according to claim 1, wherein said reconnect identifier comprises a counter and wherein the updating of said reconnect identifier comprises incrementing the counter.

3. The method according to claim 2, wherein the reconnect identifier of the disconnect request is determined identical to the reconnect identifier of the reconnect request if the counter of the disconnect request and the counter of the reconnect request are equal.

4. A system comprising:
    a file system comprising a plurality of nodes, each having a computer processor, a memory, and a plurality of processes executed by said computer processor, wherein the nodes are connected via a network interface to at least one storage device;
    a first process of the plurality of processes configured to generate a file handle, responsive to a file connect request sent by a client to said file system, wherein the handle has a handle identifier that is unique throughout the distributed file system;

a second process of the plurality of processes configured to associate a reconnect identifier with the handle identifier, wherein the reconnect identifier is indicative of a most recent connect attempt made using the respective handle identifier at a respective reconnect request;

a third process of the plurality of processes configured to send a disconnect request responsive to a disconnection, wherein the disconnect request is sent with a reconnect identifier indicative of a connection prior to the disconnection;

a fourth process of the plurality of processes configured to update the reconnect identifier, responsive to a reconnect request associated with said handle identifier;

a fifth process of the plurality of processes configured to approve the disconnect request only in a case that the reconnect identifier of the disconnect request is identical to the reconnect identifier of the most recent reconnect request indicative of a match between the reconnect request and its subsequent disconnect request or ignore the disconnect request in a case that the reconnect identifier of the disconnect request is non-identical to the reconnect identifier of the most recent reconnect request; and wherein using said reconnect identifier on said distributed file system complies with version 3 of Server Message Block (SMB3) network protocol.

5. The system according to claim 4, wherein said reconnect identifier comprises a counter and wherein the updating of said reconnect identifier at the fourth process comprises incrementing the counter.

6. The system according to claim 4, wherein the reconnect identifier of the disconnect request is determined identical to the reconnect identifier of the reconnect request if the counter of the disconnect request and the counter of the reconnect request are equal.

7. The system according to claim 4, wherein the first and the second processes are carried out by an SMB server in compliance with the SMB3 network protocol.

8. The system according to claim 4, wherein the fourth and the fifth processes are carried out by a handle state module server in compliance with the SMB3 network protocol.

9. The system according to claim 8, wherein the associating of the reconnect identifier with the handle identifier results in a reduced handle state compared with the handle state carried out at the handle state module.

10. A non-transitory computer readable medium comprising a set of instructions that when executed cause at least one processor to:

generate a file handle, responsive to a file connect request sent by a client to a distributed file system, wherein the handle has a handle identifier that is unique throughout the distributed file system;

associate a reconnect identifier with the handle identifier, wherein the reconnect identifier is indicative of a most recent connect attempt made using the respective handle identifier at a respective reconnect request;

send a disconnect request responsive to a disconnection, wherein the disconnect request is sent with a reconnect identifier indicative of a connection prior to the disconnection;

update the reconnect identifier, responsive to a reconnect request associated with said handle identifier;

approve the disconnect request only in a case that the reconnect identifier of the disconnect request is identical to the reconnect identifier of the most recent reconnect request indicative of a match between the reconnect request and its subsequent disconnect request;

ignore the disconnect request in a case that the reconnect identifier of the disconnect request is non-identical to the reconnect identifier of the most recent reconnect request; and wherein using said reconnect identifier on said distributed file system complies with version 3 of Server Message Block (SMB3) network protocol.

11. The non-transitory computer readable medium according to claim 10, wherein said reconnect identifier comprises a counter and wherein the updating of said reconnect identifier comprises incrementing the counter.

* * * * *